(12) United States Patent
Fujino et al.

(10) Patent No.: US 10,025,007 B2
(45) Date of Patent: Jul. 17, 2018

(54) TRANSPARENT CONDUCTIVE FILM

(71) Applicant: NITTO DENKO CORPORATION, Ibaraki-shi, Osaka (JP)

(72) Inventors: Nozomi Fujino, Ibaraki (JP); Daiki Kato, Ibaraki (JP); Tomotake Nashiki, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 120 days.

(21) Appl. No.: 15/304,749

(22) PCT Filed: Apr. 9, 2015

(86) PCT No.: PCT/JP2015/061123
§ 371 (c)(1),
(2) Date: Oct. 17, 2016

(87) PCT Pub. No.: WO2015/159798
PCT Pub. Date: Oct. 22, 2015

(65) Prior Publication Data
US 2017/0045645 A1    Feb. 16, 2017

(30) Foreign Application Priority Data

Apr. 17, 2014 (JP) ................. 2014-085583
Apr. 6, 2015 (JP) ................. 2015-077605

(51) Int. Cl.
*H01B 1/08* (2006.01)
*B32B 9/00* (2006.01)
(Continued)

(52) U.S. Cl.
CPC .................. *G02B 1/14* (2015.01); *B32B 9/00* (2013.01); *B32B 27/08* (2013.01); *B32B 27/16* (2013.01);
(Continued)

(58) Field of Classification Search
CPC ....... B32B 9/00; B32B 27/20; B32B 2255/20; B32B 2255/26; B32B 2255/28; H01B 1/08; H01B 1/14
See application file for complete search history.

(56) References Cited

U.S. PATENT DOCUMENTS 6,617,056 B1    9/2003  Hara et al.
2002/0158853 A1 10/2002  Sugawara et al.
(Continued)

FOREIGN PATENT DOCUMENTS

CN    1302442 A    7/2001
CN    1707700 A    12/2005
(Continued)

OTHER PUBLICATIONS

Notification of Transmittal of Translation of the International Preliminary Report on Patentability (Form PCT/IB/338) issued in counterpart International Application No. PCT/JP2015/061123, dated Oct. 27, 2016, with Forms PCT/IB/373 and PCT/ISA/237. (5 pages).

(Continued)

*Primary Examiner* — Vu A Nguyen
(74) *Attorney, Agent, or Firm* — Westerman, Hattori, Daniels & Adrian, LLP

(57) ABSTRACT

There is provided a transparent conductive film which has a transparent conductive layer having low specific resistance and has excellent scratch resistance. A transparent conductive film of the present invention includes: a transparent film substrate; at least three undercoat layers; and a transparent conductive layer in this order. The at least three undercoat layers include: a first undercoat layer formed by a wet coating method; a second undercoat layer that is a metal oxide layer having an oxygen deficient; and a third undercoat layer that is an $SiO_2$ film from a side of the film substrate. The third undercoat layer has a density of 2.0

(Continued)

g/cm³ or more and 2.8 g/cm³ or less. The transparent conductive layer has specific resistance of $1.1 \times 10^{-4}$ Ω·cm or more and $3.8 \times 10^{-4}$ Ω·cm or less.

12 Claims, 1 Drawing Sheet

(51) Int. Cl.
    *G02B 1/14*     (2015.01)
    *G06F 3/041*     (2006.01)
    *H01B 5/14*     (2006.01)
    *G02B 1/11*     (2015.01)
    *B32B 27/08*     (2006.01)
    *B32B 27/16*     (2006.01)

(52) U.S. Cl.
    CPC ............... *G02B 1/11* (2013.01); *G06F 3/041* (2013.01); *H01B 1/08* (2013.01); *H01B 5/14* (2013.01); *B32B 2255/10* (2013.01); *B32B 2255/20* (2013.01); *B32B 2255/26* (2013.01); *B32B 2255/28* (2013.01); *B32B 2307/302* (2013.01); *B32B 2307/412* (2013.01); *B32B 2307/418* (2013.01); *B32B 2307/538* (2013.01); *B32B 2307/704* (2013.01)

(56) References Cited

U.S. PATENT DOCUMENTS

| | | |
|---|---|---|
| 2005/0269707 A1 | 12/2005 | Nashiki et al. |
| 2006/0261447 A1 | 11/2006 | Seto et al. |
| 2007/0091074 A1* | 4/2007 | Nashiki ............ B32B 3/085 345/173 |
| 2009/0104440 A1 | 4/2009 | Nashiki et al. |
| 2013/0213703 A1 | 8/2013 | Kawaguchi et al. |
| 2014/0092027 A1 | 4/2014 | Kuo et al. |
| 2014/0370275 A1 | 12/2014 | Kuchiyama et al. |

FOREIGN PATENT DOCUMENTS

| | | |
|---|---|---|
| JP | 2002-326301 A | 11/2002 |
| JP | 2004-362842 A | 12/2004 |
| JP | 2009-104842 A | 5/2009 |
| JP | 2014-124914 A | 7/2014 |
| JP | 2014-164882 A | 9/2014 |
| JP | 2014-168938 A | 9/2014 |
| TW | 201303668 A1 | 1/2013 |
| TW | 201349308 A | 12/2013 |
| WO | 2004/112057 A1 | 12/2004 |
| WO | 2012/063903 A1 | 5/2012 |
| WO | 2013/111681 A1 | 8/2013 |
| WO | 2014/054532 A1 | 4/2014 |

OTHER PUBLICATIONS

International Search Report dated Jul. 14, 2015, issued in counterpart International Application No. PCT/JP2015/061123 (2 pages).
Taiwanese Office Action dated May 23, 2016, issued in counterpart Taiwanese Patent Application No. 104111980 (12 pages).
Decision to Grant a Patent dated May 30, 2017, issued in counterpart Japanese Application No. 2016-089548, with English translation. (6 pages).
Office Action dated Jul. 5, 2017, issued in counterpart Chinese Application No. 201510185665.9, with English translation. (20 pages).

\* cited by examiner

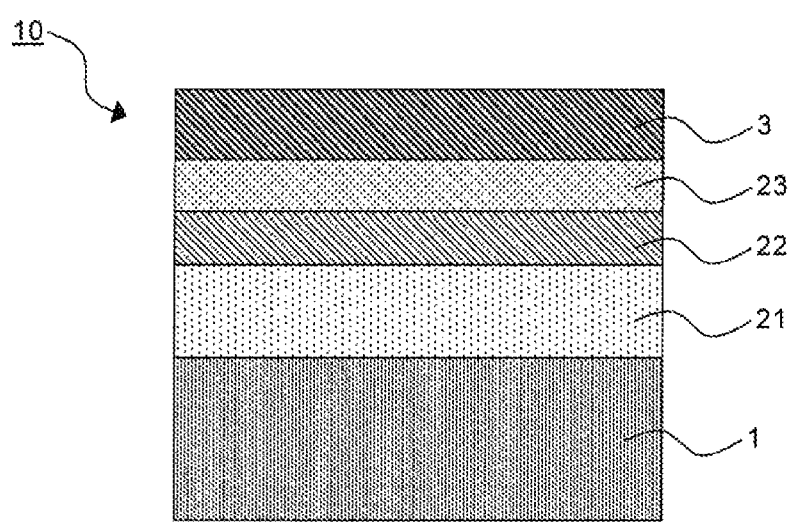

TRANSPARENT CONDUCTIVE FILM

TECHNICAL FIELD

The present invention relates to a transparent conductive film.

BACKGROUND ART

In a touch panel display device which has recently been spread at a high rate, a transparent electrode including a transparent conductive layer made of an indium-tin composite oxide (ITO) or the like has been used. Although a conductive body with a transparent electrode used for a touch panel fundamentally uses a glass or plastic film as a substrate, a transparent conductive film using a plastic film is preferably used in a smart phone or tablet particularly requiring portability from the viewpoint of thinness and weight.

In recent years, improvements in the sensor sensitivity or resolution of the transparent electrode have been demanded against the background of the high grade of the touch panel. As a result, the level of the specific resistance value required for the transparent conductive layer tends to be increasingly decreased.

In the meantime, since the transparent conductive layer is brittle, the transparent conductive layer is easily deteriorated under the influence of external factors, which is apt to cause an increase in a specific resistance value. Therefore, in order to keep the specific resistance value of the transparent conductive film low, it is necessary to improve the maintenance reliability of the specific resistance value of the transparent conductive film so as to numerically decrease the specific resistance value of the transparent conductive layer and to allow the value to be maintained as much as possible.

Examples of the external factors causing the deterioration include physical contact such as collision or friction to the surface of the transparent conductive layer. The physical contact easily causes flaws on the surface of the transparent conductive layer, which is apt to cause an increase in the resistance value of the surface.

Particularly, when the transparent conductive film is handled in various processing treatments required in order to use the transparent conductive film as a touch panel sensor (for example, pattern etching treatment), flaws may be caused on the surface of the transparent conductive layer of the transparent conductive film, which disadvantageously has a bad influence on resistance characteristics.

Hitherto, in order to address scratch resistance, the present inventors have proposed to obtain a transparent conductive laminate improved in transparency, scratch resistance, and bending resistance or the like by forming a transparent dielectric thin film such as an $SiO_2$ thin film, on one side of a transparent film substrate, and a transparent conductive thin film made of an indium-tin composite oxide or the like, on the $SiO_2$ thin film, or laminating a transparent substrate on the opposite side of the film substrate via an adhesive layer (see Patent Document 1).

PRIOR ART DOCUMENT

Patent Document

Patent Document 1: JP-A-2002-326301

SUMMARY OF THE INVENTION

Problems to be Solved by the Invention

However, the constitution of the Document applies cushioning properties due to the adhesive layer, to improve durability over scratch resistance or the like. Sufficient scratch resistance is not obtained without having the adhesive layer. Since the density of the dielectric thin film is not particularly considered, sufficient scratch resistance at the level of a specific resistance value of $3.8 \times 10^{-4}$ Ω·cm or less cannot be achieved.

A coefficient of fluctuation from the reference value of a specific resistance value caused by the deterioration in a transparent conductive layer in the range of a low specific resistance value tends to be relatively increased as compared with that in the range of a high specific resistance value. Therefore, the conductive film having low specific resistance is apt to bring about obstacles caused by deterioration in the real use, and requires higher scratch resistance. On the other hand, in recent years, from the viewpoint of securing a high display quality in the touch panel, a transparent conductive layer tends to be thinner and brittler in order to improve light transmittance. Thus, while the scratch resistance is being thought as important in the present field, the securement of the moist-heat resistance becomes more difficult.

The present invention has been made in view of the problems, and it is an object of the present invention to provide a transparent conductive film which has a transparent conductive layer having low specific resistance and has excellent scratch resistance.

Means for Solving the Problems

As a result of wholehearted research of the present inventors to solve the conventional problems, it was found that the object can be achieved by adopting the following constitution, leading to the completion of the present invention.

That is, the present invention relates to a transparent conductive film including:

a transparent film substrate;

at least three undercoat layers; and a transparent conductive layer in this order, wherein:

the at least three undercoat layers include:

a first undercoat layer formed by a wet coating method;

a second undercoat layer that is a metal oxide layer having an oxygen deficient; and a third undercoat layer that is an $SiO_2$ film from a side of the film substrate;

the third undercoat layer has a density of 2.0 g/cm$^3$ or more and 2.8 g/cm$^3$ or less; and the transparent conductive layer has a specific resistance of $1.1 \times 10^{-4}$ Ω·cm or more and $3.8 \times 10^{-4}$ Ω·cm or less In a crystalline state.

In the transparent conductive film of the present invention, film strength is increased by setting the density of the third undercoat layer to a predetermined range. Since the third undercoat layer having high film strength is provided as an underlying layer on the back side (film substrate side) of the transparent conductive layer, this can serve as a reinforcing layer to improve the scratch resistance of the transparent conductive film.

The third undercoat layer is an $SiO_2$ film. Since the $SiO_2$ film generally has good transparency, compactness, and durability, and high adhesion with the transparent conductive layer, the $SiO_2$ film is preferable as the undercoat layer.

However, the $SiO_2$ film is a metal oxide having a stoicheiometric composition, and has a chemically stable lattice structure. Thereby, when the $SiO_2$ film is directly formed on the first undercoat layer, only a physical anchoring force acts between the $SiO_2$ film and the film substrate, which causes a decrease in adhesion. This state makes it difficult to provide sufficient scratch resistance.

Since the surface roughness Ra of the transparent conductive layer is the small value, a surface area brought into contact with water molecules in a high-temperature and high-humidity atmosphere can be decreased, which can eliminate an event which may cause deterioration in the transparent conductive layer as much as possible.

Thus, an adhesion improving action due to the second undercoat layer and a reinforcing action due to the third undercoat layer can provide an improvement in the scratch resistance of the transparent conductive film.

The transparent conductive film includes the first undercoat layer formed by a wet coating method as an underlying layer of the transparent conductive layer. Since the thickness of the film substrate is generally more than that of other element, the influence of the film substrate on the surface roughness Ra of the upper layer is also increased. By forming the first undercoat layer by the wet coating method, the surface convexoconcave of the film substrate can be filled, and thereby the surface roughness Ra of the transparent conductive layer which will be formed on the upper layer can also be decreased. As a result, the specific resistance of the transparent conductive layer in the crystalline state can be reduced to an extremely low range of $1.1\times10^{-4}$ Ω·cm or more and $3.8\times10^{-4}$ Ω·cm or less.

The transparent conductive layer according to the present invention may satisfy the range of the specific resistance value as long as the transparent conductive layer is in a crystalline state. In an amorphous state, the range of the specific resistance value is not limited at all. Whether the amorphous transparent conductive layer satisfies the range of the specific resistance value in a crystalline state may be determined by actually subjecting the transparent conductive layer to crystal conversion to provide the crystalline transparent conductive layer, and measuring the specific resistance value of the crystalline transparent conductive layer. Although the means for the crystal conversion is not particularly limited, a crystal conversion treatment to be described later may be adopted.

The thickness of the second undercoat layer is preferably 1 nm or more and 10 nm or less. The thickness is set to the lower limit or more, which facilitates the formation of the second undercoat layer as a continuous film. On the other hand, the thickness is set to the upper limit or less, which is likely to prevent the transmissivity of the second undercoat layer itself from being decreased.

The second undercoat layer is preferably an $SiO_x$ film (x is 1.0 or more and less than 2) from the viewpoint of transparency, durability, and adhesion.

The transparent conductive layer and the third undercoat layer are preferably brought into contact with each other. This can provide an improvement in the adhesion of the transparent conductive layer to the underlying layer to exhibit good scratch resistance.

In one embodiment, the first undercoat layer may contain an organic resin. When the first undercoat layer contains the organic resin, the first undercoat layer can be easily smoothed, and the specific resistance can be decreased. A coating solution suitable for the wet coating method is easily prepared, and optical characteristics are also easily adjusted. Furthermore, both the hardness and flexibility of the transparent conductive film are easily achieved.

In one embodiment, the first undercoat layer may contain an organic resin, and may further contain an inorganic particle. When the first undercoat layer contains the inorganic particle, the hardness of the film can be reinforced, and the optical characteristics are easily adjusted.

The thickness of the third undercoat layer is preferably 8 nm or more and 100 nm or less. Thereby, sufficient scratch resistance can be exhibited. The thickness is less than the lower limit, which causes insufficient scratch resistance. The thickness is more than the upper limit, which causes deteriorations in bending resistance and productivity.

The transparent conductive layer preferably has a refractive index of 1.89 or more and 2.20 or less. By adopting the refractive index of the range, the film density of the transparent conductive layer is increased, which provides a transparent conductive film having low specific resistance and scratch resistance.

The transparent conductive film has a low level of resistance by crystallizing the transparent conductive layer.

The transparent conductive layer is preferably an indium-tin composite oxide layer. When the transparent conductive layer is the indium-tin composite oxide (hereinafter, referred to as "ITO") layer, it is possible to forma transparent conductive layer that has lower resistance, high transparency, and good moist-heat resistance, and that can be easily crystallized.

The content of tin oxide in the indium-tin composite oxide layer is preferably 0.5% by weight to 15% by weight based on the total amount of tin oxide and indium oxide. This can increase a carrier density to advance lower specific resistance. The content of tin oxide can be appropriately selected in the range according to the specific resistance of the transparent conductive layer.

It is preferable that the transparent conductive layer has a structure where a plurality of indium-tin composite oxide layers are laminated; and at least two layers of the plurality of indium-tin composite oxide layers have existing amounts of tin different from each other. Such a specific layer structure of the transparent conductive layer can advance the shortening of a crystal conversion time and the lower resistance of the transparent conductive layer.

In one embodiment of the present invention, it is preferable that the transparent conductive layer includes a first indium-tin composite oxide layer and a second indium-tin composite oxide layer in this order from the side of the film substrate; the content of tin oxide in the first indium-tin composite oxide layer is 6% by weight to 15% by weight based on the total amount of tin oxide and indium oxide; and the content of tin oxide in the second indium-tin composite oxide layer is 0.5% by weight to 5.5% by weight based on the total amount of tin oxide and indium oxide. The two-layered structure can achieve the shortening of the crystal conversion time of the transparent conductive layer, and suppress the low specific resistance value.

BRIEF DESCRIPTION OF THE DRAWINGS

FIG. 1 is a schematic cross-sectional view showing a transparent conductive film according to one embodiment of the present invention.

MODE FOR CARRYING OUT THE INVENTION

An embodiment of the present invention will be described below with reference to the drawings. However, parts which are unnecessary for the explanation are omitted, and there are parts which are enlarged or shrunk in the drawings to make the explanation easy. The terms each denoting a positional relationship such as the terms "upper" and "lower" are used merely for making the description easy unless the mentions are exceptional, and each never have an intention of limiting the constitution of the present invention.

FIG. 1 is a schematic cross-sectional view showing a transparent conductive film according to one embodiment of the present invention. That is, a transparent conductive film 10 includes a transparent film substrate 1, at least three undercoat layers, and a transparent conductive layer 3 in this order. The at least three undercoat layers include a first undercoat layer 21 formed by a wet coating method, a second undercoat layer 22 that is a metal oxide layer having an oxygen deficient, and a third undercoat layer 23 that is a $SiO_2$ film from the side of the film substrate 1.

<Film Substrate>

The film substrate 1 has strength necessary for ease of handling, and has transparency in the visible light range. A film having excellent transparency, heat resistance, and surface smoothness is preferably used as the film substrate. Examples of the material for such a film include polyester such as polyethylene terephthalate or polyethylene naphthalate, polyolefin, poly(cycloolefin), polycarbonate, polyether sulfone, polyarylate, polyimide, polyamide, polystyrene, and homopolymers or copolymers of norbornene or the like. Among these, a polyester resin is appropriately used because the polyester resin has excellent transparency, heat resistance, and mechanical characteristics. Polyethylene terephthalate (PET) and polyethylene naphthalate (PEN) or the like are particularly suitable as the polyester resin. From the viewpoint of strength, it is preferable that a stretching treatment is performed on the film substrate, and it is more preferable that a biaxial stretching treatment is performed thereon. The stretching treatment is not particularly limited, and a known stretching treatment can be adopted. The constitution of the present embodiment can provide a transparent conductive film having high scratch resistance even when a substrate having comparatively low strength such as norbornene is adopted, for example.

The thickness of the film substrate is not particularly limited, but the thickness is preferably 20 μm or more and 200 μm or less, and more preferably 40 μm or more and 150 μm or less. When the thickness of the film is less than 20 μm, the appearance of the film may be deteriorated by the amount of heat during vacuum film formation. On the other hand, when the thickness of the film exceeds 200 μm, improvements in the abrasion resistance of a transparent conductive layer 2 may not be achieved. When the thickness of the film substrate is 40 μm or more, abrasion resistance and roll-to-roll transporting easiness can be improved.

The surface of the substrate may be previously subjected to sputtering, corona discharge treatment, bombard treatment, ultraviolet irradiation, electron beam irradiation, chemical conversion, oxidization, etching treatment, or undercoating treatment such that the adhesion of the substrate to the first undercoat layer 21 formed on the substrate can be improved. If necessary, the surface of the substrate may also be subjected to dust removing or cleaning by solvent cleaning and ultrasonic cleaning or the like, before the first undercoat layer 21 is formed.

The polymer film as the film substrate 1 is provided in a roll in which a long film is wound, and the transparent conductive layer 3 can be continuously formed thereon by a roll-to-roll method to give the long transparent conductive film.

<First Undercoat Layer>

The first undercoat layer 21 is formed by a wet coating method. For example, in the wet coating method, an organic undercoat layer can be appropriately formed by diluting an organic resin or other additive with a solvent, applying the mixed material solution onto the film substrate, and subjecting the material solution to a curing treatment (for example, a heat curing treatment and a UV curing treatment).

The wet coating method can be appropriately selected according to the material solution and the desired characteristics of the undercoat layer. For example, a dip coating method, an air knife method, a curtain coating method, a roller coating method, a wire bar coating method, a gravure coating method, or an extrusion coating method or the like can be adopted.

In the undercoat layer formed by the wet coating method, a residual ingredient derived from a solvent or a resin or the like usually exists. For this reason, it is possible to analyze and detect the residual ingredient to specify whether the undercoat layer is a film formed by the wet coating method. The analysis method is not particularly limited. For example, the residual ingredient can be analyzed by electron spectrometry for chemical analysis (ESCA) and secondary ion mass spectrometry (SIMS) or the like. By analyzing an analysis sample while etching the analysis sample with predetermined element ions, the residual ingredient can be detected. Generally, carbon (C), hydrogen (H), and nitrogen (N) or the like can be adopted as the residual ingredient to be analyzed.

When an organic resin is used as a material for forming the undercoat layer, a dry type coating method cannot be usually adopted. Therefore, when the main ingredient of the undercoat layer is an organic resin, the undercoat layer can be regarded as a film produced by the wet coating method.

According to the consideration of the present inventors, surface roughness is increased depending on the film substrate, which may make it impossible to stably produce a transparent conductive film having low specific resistance. However, the surface convexoconcave of a film substrate of which surface roughness is not sufficiently small can be filled by forming the first undercoat layer according to the wet coating method, which can provide a stable decrease in the surface roughness of the transparent conductive layer.

A material for forming the first undercoat layer 21 is preferably an organic resin having a refractive index of about 1.4 to 1.6 such as an acrylic resin, an urethane resin, a melamine resin, an alkyd resin, a siloxane-based polymer, and an organosilane condensate.

The first undercoat layer 21 preferably further contains an inorganic particle. This can provide easy adjustment of the refractive index and an improvement in scratch resistance. Examples of the inorganic particles include fine particles made of silicon oxide (silica), hollow nano-silica, titanium oxide, aluminum oxide, zinc oxide, tin oxide, and zirconium oxide or the like. Among these, fine particles made of silicon oxide (silica), titanium oxide, aluminum oxide, zinc oxide, tin oxide, and zirconium oxide are preferable. These may be used alone, or used in combination of two or more thereof. From the viewpoint of decreasing the surface roughness of the first undercoat layer, the average particle diameter of the particles is preferably 70 nm or less, and more preferably 30 nm or less.

By using a mixture of the organic resin and inorganic particle for the material for forming the first undercoat layer 21, the refractive index can be easily adjusted, and stable improvement in scratch resistance can be expected. The optical refractive index of the first undercoat layer 21 is preferably 1.55 to 1.80, more preferably 1.60 to 1.75, and still more preferably 1.63 to 1.70. The range can provide an improvement in transmissivity and a decrease in the reflectance difference between the surface of the undercoat layer and the surface of the transparent conductive layer when the transparent conductive layer is patterned.

The thickness of the first undercoat layer 21 may be appropriately set to such an extent that the effects of the present invention are not impaired. For example, when the first undercoat layer 21 does not contain the inorganic particle, the thickness of the first undercoat layer 21 is preferably 0.01 µm to 2.5 µm, more preferably 0.02 µm to 1.5 µm, and still more preferably 0.03 µm to 1.0 µm. On the other hand, when the first undercoat layer 21 contains the inorganic particle, the thickness is preferably 0.05 µm to 2.5 µm, more preferably 0.07 to 1.5 µm, and still more preferably 0.3 µm to 1.0 µm from the viewpoint of reducing the unevenness in the undercoat layer caused by the content particle. When the thickness of the first undercoat layer is too thin regardless of the existence or nonexistence of the inorganic particle, sufficient scratch resistance may not be obtained. When the thickness is too thick, the bending resistance of the first undercoat layer is deteriorated, which tends to be apt to cause cracks.

The surface roughness Ra of the first undercoat layer 21 is preferably 0.1 nm to 1.5 nm, more preferably 0.1 nm to 1.0 nm, still more preferably 0.1 nm to 0.8 nm, and particularly preferably 0.1 to 0.7 nm. When the surface roughness Ra of the first undercoat layer 21 is less than 0.1 nm, the adhesion between the first undercoat layer and the second undercoat layer is concernedly deteriorated. When the surface roughness Ra exceeds 1.5 nm, the specific resistance cannot be suppressed low. Herein, the surface roughness Ra means arithmetic average roughness Ra measured by AFM (Atomic Force Microscope).

<Second Undercoat Layer>

The second undercoat layer 22 formed on the first undercoat layer 21 is a metal oxide layer having an oxygen deficient. Herein, "having an oxygen deficient" means a non-stoicheiometric composition. Examples of a metal oxide having an oxygen deficient include $SiO_x$ (x is 1.0 or more and less than 2), $Al_2O$, (x is 1.5 or more and less than 3), $TiO_x$ (x is 1.0 or more and less than 2), $Ta_2O_x$ (x is 2.5 or more and less than 5), $ZrO_x$ (x is 1.0 or more and less than 2), $ZnO_x$ (x is more than 0 and less than 1), and $Nb_2O_x$ (x is 2.5 or more and less than 5.0). Among these, $SiO_x$ (x is 1.0 or more and less than 2) is preferable.

Herein, the metal oxide having an oxygen deficient, and furthermore the non-stoicheiometric composition can be confirmed by analyzing the oxidation state of the metal oxide by X-ray photoelectron spectroscopy.

When $SiO_x$ is taken for an example, the binding energy of a Si2p orbit may be calculated by X-ray photoelectron spectroscopy. When the calculated value is lower than the binding energy of $SiO_2$ having a stoicheiometric composition at this time, $SiO_x$ can be determined to have a non-stoicheiometric composition. Usually, if the calculated value is less than 104 eV, $SiO_x$ can be determined to have at least a non-stoicheiometric composition.

The second undercoat layer 22 is preferably formed by a dry process. An x value in the composition formula can be controlled by adjusting the introduction amount of oxygen into a chamber of a sputter device when a sputtering method is adopted, for example. When $SiO_x$ is taken for an example, and pure metal Si is used for a metal target, the introduction amount of oxygen may be adjusted within the range of 0% to 20% based on 100% of a sputtering gas. When suboxide ($SiO_x$) is used for the metal target, the introduction amount of oxygen may be adjusted at a level lower than the range. The sputtered metal atom holds high kinetic energy, and collides with the surface of the first undercoat layer 21. This is continuously repeated to laminate the metal atoms, thereby forming the second undercoat layer. In that case, oxygen in the chamber is introduced into the film, and thereby the second undercoat layer having a constant amount of oxygen is formed.

Generally, the total amount of the contact surface between the layer having high smoothness such as the first undercoat layer and the upper layer is decreased, which does not sufficiently provide a physical anchoring force between the two layers to make it difficult to secure the adhesion. However, by providing the second undercoat layer as the upper layer of the first undercoat layer, a chemical bond can be formed between the metal atom of which the bond in the second undercoat layer is less than perfect and the atom existing on the outermost surface of the first undercoat layer 21, which is considered to provide firm adhesion due to the chemical bond even when the second undercoat layer 22 is formed on the first undercoat layer 21 having a small surface roughness.

The thickness of the second undercoat layer 22 is preferably 1 nm to 10 nm, and more preferably 1 nm to 8 nm. When the thickness is less than 1 nm, a continuous film cannot be formed, and the adhesion cannot be held. When the thickness is more than 10 nm, the absorption in the second undercoat layer 22 is expressed, which tends to cause a decrease in transmissivity.

The second undercoat layer 22 may not have a uniform composition in a thickness direction. For example, in only a neighborhood area including the interface between the second undercoat layer 22 and the first undercoat layer 21, an x value may be set to a low value. The x value may be set to a high value in the other area. When the x value in the neighborhood area is sufficiently low, high adhesion between the second undercoat layer 22 and the first undercoat layer can be secured. The range of the neighborhood area may be 10 to 30% of the thickness of the second undercoat layer.

The refractive index of the second undercoat layer is preferably 1.5 to 1.90, and more preferably 1.50 to 1.85. The range can provide a transparent conductive film having good optical characteristics.

Although the second undercoat layer 22 is preferably brought into contact with the first undercoat layer 21, a separate layer may be further interposed between the second undercoat layer 22 and the first undercoat layer 21 as long as the object of the present invention is not impaired.

Examples of the layer include a metal layer made of a metal which is not oxidized. The metal layer is interposed, and thereby the adhesion between the second undercoat layer 22 and the first undercoat layer 21 may be further improved.

<Third Undercoat Layer>

The third undercoat layer 23 formed on the second undercoat layer 22 is a $SiO_2$ film that is a metal oxide film substantially having a stoicheiometric composition. The $SiO_2$ film generally has good transparency, compactness, and durability, and high adhesion with the transparent conductive layer. The $SiO_2$ film has a comparatively low refractive index as a metal oxide, which is likely to suppress the reflection of light at the interface between the SiO$_2$ film and the transparent conductive layer.

Herein, the stoicheiometric composition can be confirmed by analyzing the oxidation state of the metal oxide by X-ray photoelectron spectroscopy. However, in the X-ray photoelectron spectroscopy, even a layer obtained through a theoretical total oxidation state may not be determined to have a stoicheiometric composition depending on the conditions of measurement. In that case, it is determined whether the third undercoat layer has a stoicheiometric composition by measuring the refractive index of the metal oxide. When SiO$_2$ is taken for an example, and the refractive index is 1.43 or more and 1.49 or less, it is determined that SiO$_2$ has a stoicheiometric composition. When the refractive index is 1.50 or more and 1.90 or less, it is determined that SiO$_2$ has an oxygen deficient.

The density of the third undercoat layer is preferably 2.0 g/cm$^3$ to 2.8 g/cm$^3$, more preferably 2.05 g/cm$^3$ to 2.5 g/cm$^3$, and still more preferably 2.1 g/cm$^3$ to 2.4 g/cm$^3$. When the film density is within the range, sufficient scratch resistance can be exhibited. The density of the third undercoat layer may be measured after the transparent conductive layer is removed from the transparent conductive film. The removing method is preferably wet etching using a predetermined etchant and condition. When the transparent conductive layer is an ITO film, wet etching using hydrochloric acid is preferable. The condition of the wet etching may be appropriately set so that the ITO film is certainly removed. The ITO film is usually immersed in hydrochloric acid (concentration: 10% by weight) at 50° C. for 2 minutes, and thereby the ITO film can be certainly removed even when the ITO film is amorphous or crystalline. When the ITO film is amorphous, the temperature condition may be room temperature (for example, 20° C.

The thickness of the third undercoat layer is 8 nm or more and 100 nm or less, preferably 10 nm or more and 80 nm or less, more preferably 12 nm or more and 50 nm or less, and still more preferably 17 nm or more and 50 nm or less. This can provide an increase in film strength to improve scratch resistance, and good productivity.

The third undercoat layer 23 is preferably formed by a sputtering method. A particularly dense film can be stably formed by the sputtering method of the dry process techniques. Since the density of the film formed by the sputtering method is higher than that formed by a vacuum deposition method, for example, the moisture vapor permeability is low, and the surface roughness is also suppressed, which can provide the transparent conductive film having excellent scratch resistance.

Since a reactant gas emitted from the film substrate 1 is suppressed by the second undercoat layer 22, the third undercoat layer 23 can be formed by carrying out reactive sputtering while introducing an oxygen gas in order that the third undercoat layer 23 stably has a stoicheiometric composition. Since the third undercoat layer of the present embodiment is a SiO$_2$ film, when pure metal Si is used for the metal target, the introduction amount of oxygen may be 21% or more based on 100% of a sputtering gas, and preferably 21 to 60%. Suboxide (SiO$_x$) used for the metal target may be adjusted at a level lower than the range. By forming a film while introducing a proper amount of oxygen gas, the third undercoat layer having a high film density and high transparency can be formed.

The atmosphere pressure when the third undercoat layer 23 is formed by sputtering is preferably 0.09 Pa to 0.5 Pa, and more preferably 0.09 Pa to 0.3 Pa. A higher-density metal oxide film can be formed by setting the atmosphere pressure to the above range.

The second undercoat layer and the third undercoat layer preferably contain the same type of metal element. The constitution can provide an improvement in an adhesion force between the layers. Furthermore, the constitution is less likely to provide the formation of a clear layer boundary, which makes it possible to suppress the penetration of water between the second undercoat layer and the third undercoat layer.

The second undercoat layer and the third undercoat layer may be a continuous layer having no layer boundary. The constitution can improve the interlayer adhesion between the second undercoat layer and the third undercoat layer. The continuous layer can be formed by forming the second undercoat layer, and then continuously forming the third undercoat layer without opening the surface of the second undercoat layer to the atmosphere when the sputtering method is adopted as the method for layer formation, for example.

When the second undercoat layer and the third undercoat layer form a continuous layer having no layer boundary, the density of the third undercoat layer may be regarded as the density of an area having a stoicheiometric composition in the whole continuous layer. According to the X-ray reflectivity method, even in such a continuous layer, the density of the area having a stoicheiometric composition can be measured with sufficient accuracy.

Between the third undercoat layer and the transparent conductive layer, a metal oxide layer having an oxygen deficient may be further provided as a fourth undercoat layer. As the fourth undercoat layer, the same one as the second undercoat layer can be adopted. The constitution can improve the adhesion between the third undercoat layer and the transparent conductive layer, and further improve the scratch resistance.

<Transparent Conductive Layer>

The constitutional material of the transparent conductive layer 3 is not particularly limited, and a metal oxide of at least one metal selected from the group consisting of In, Sn, Zn, Ga, Sb, Ti, Si, Zr, Mg, Al, Au, Ag, Cu, Pd and W is appropriately used. The metal oxide may further contain metal atoms indicated in the aforementioned group as needed. For example, it is preferable to use an indium-tin composite oxide (ITO) and an antimony-tin composite oxide (ATO) or the like, and it is particularly preferable to use ITO.

The surface roughness Ra of the transparent conductive layer 3 is preferably 0.1 nm or more and 1.6 nm or less. The upper limit of the surface roughness Ra is preferably 1.5 nm or less, more preferably 1.3 nm or less, and still more preferably 1.2 nm or less. When the surface roughness Ra is too small, a coefficient of friction may be increased to cause deterioration in scratch resistance, and the adhesion between a resist which is formed when the transparent conductive film is patterned and the transparent conductive layer is deteriorated, which may cause poor processing. When the surface roughness Ra is too large, the specific resistance tends to be deteriorated.

The transparent conductive layer 3 is preferably crystalline. The crystalline transparent conductive layer can have low specific resistance even if the transparent conductive layer 3 is a thin film.

The crystalline transparent conductive layer 3 can be determined by immersing the transparent conductive layer 3 in hydrochloric acid at 20° C. (concentration: 5% by weight) for 15 minutes, thereafter washing with water and drying, and measuring the resistance between terminals at an interval of about 15 mm. Herein, it is determined that crystallization of the ITO layer into crystalline has been completed, when the resistance between the terminals at an interval of 15 mm is not more than 10 kΩ (that is, 10 kΩ or less) after immersing in hydrochloric acid, washing with water and drying.

When the transparent conductive layer is amorphous, the amorphous conductive layer may be converted into a crystalline conductive layer by a crystal conversion treatment. Although means for the crystal conversion treatment is not particularly limited, a heat treatment may be adopted. A heating temperature and heating time for the heat treatment may be under a condition in which the transparent conductive layer can be certainly crystallized. From the viewpoint of productivity, the transparent conductive layer is heat-treated usually preferably at 150° C. for 45 minutes or less, and more preferably at 150° C. for 30 minutes or less.

The crystalline transparent conductive layer 3 may have a low specific resistance value of $1.1 \times 10^{-4}$ Ω·cm or more and $3.8 \times 10^{-4}$ Ω·cm or less. The specific resistance value is preferably $1.1 \times 10^{-4}$ Ω·cm or more and $3.5 \times 10^{-4}$ Ω·cm or less, more preferably $1.1 \times 10^{-4}$ Ω·cm or more and $3.4 \times 10^{-4}$ Ω·cm or less, and still more preferably $1.1 \times 10^{-4}$ Ω·cm or more and $3.2 \times 10^{-4}$ Ω·cm or less. The transparent conductive layer 3 may satisfy the range of the specific resistance value in the crystalline state. The range of the specific resistance value is not be limited at all in the amorphous state.

A surface resistance value can be further reduced by subjecting the transparent conductive layer to crystal conversion. The surface resistance value of the crystalline transparent conductive layer is preferably 40Ω/□ to 200Ω/□, more preferably 40Ω/□ to 150Ω/□, and still more preferably 40Ω/□ to 140Ω/□.

The refractive index of the transparent conductive layer 3 is preferably 1.89 to 2.2, and more preferably 1.90 to 2.2. The hardness of the film can be improved by setting the optical refractive index to the range. The refractive index herein means a refractive index of a wavelength of 550 nm. The refractive index is obtained by measurement under conditions of a measurement wavelength: 195 nm to 1680 nm, and incidence angle: 65 degrees, 70 degrees, 75 degrees using a high-speed spectroscopic ellipsometer (M-2000DI manufactured by J. A. Woollam).

When ITO (indium-tin composite oxide) is used as the materials which are used to form the transparent conductive layer 3, the content of tin oxide ($SnO_2$) in the metal oxide is preferably 0.5% by weight to 15% by weight, more preferably 3 to 15% by weight, still more preferably 5 to 12% by weight, and particularly preferably 6 to 12% by weight, based on the total amount of tin oxide and indium oxide ($In_2O_3$). When the amount of tin oxide is too small, the durability of the ITO film may be deteriorated. When the amount of tin oxide is too large, the crystallization of the ITO film becomes difficult, and the transparency and the stability of the resistance value may be insufficient.

The term "ITO" herein may be a composite oxide which contains at least indium (In) and tin (Sn), and may contain additional components other than indium and tin. Examples of the additional components include metal elements other than In and Sn. Specific examples thereof include Zn, Ga, Sb, Ti, Si, Zr, Mg, Al, Au, Ag, Cu, Pd, W, Fe, Pb, Ni, Nb, Cr, Ga, and a combination thereof. Although the content of the additional component is not particularly limited, the content may be 3% by weight or less.

The transparent conductive layer 3 may have a structure where a plurality of indium-tin composite oxide layers having existing amounts of tin different from each other are laminated. In this case, the number of the ITO layers may be 2 or 3 or more.

When the transparent conductive layer 3 has a two-layered structure where a first indium-tin composite oxide layer and a second indium-tin composite oxide layer are laminated in this order from the side of the film substrate 1, the content of tin oxide in the first indium-tin composite oxide layer is preferably 6% by weight to 15% by weight, more preferably 6 to 12% by weight, and still more preferably 6.5 to 10.5% by weight, based on the total amount of tin oxide and indium oxide. The content of tin oxide in the second indium-tin composite oxide layer is preferably 0.5% by weight to 5.5% by weight, more preferably 1 to 5.5% by weight, and still more preferably 1 to 5% by weight, based on the total amount of tin oxide and indium oxide. By setting the amount of tin of each ITO layer to the above range, a transparent conductive film having small specific resistance and easiness of crystal conversion can be formed.

When the transparent conductive layer 3 has a three-layered structure where a first indium-tin composite oxide layer, a second indium-tin composite oxide layer, and a third indium-tin composite oxide layer are laminated in this order from the side of the film substrate 1, the content of tin oxide in the first indium-tin composite oxide layer is preferably 0.5% by weight to 5.5% by weight, more preferably 1 to 4% by weight, and still more preferably 2 to 4% by weight, based on the total amount of tin oxide and indium oxide. The content of tin oxide in the second indium-tin composite oxide layer is preferably 6% by weight to 15% by weight, more preferably 7 to 12% by weight, and still more preferably 8 to 12% by weight, based on the total amount of tin oxide and indium oxide. The content of tin oxide in the third indium-tin composite oxide layer is preferably 0.5% by weight to 5.5% by weight, more preferably 1 to 4% by weight, and still more preferably 2 to 4% by weight, based on the total amount of tin oxide and indium oxide. By setting the amount of tin of each ITO layer to the above range, a transparent conductive film having small specific resistance can be formed.

The thickness of the transparent conductive layer 3 (the total thickness in the case of the laminated structure) is preferably 15 nm or more and 40 nm or less, more preferably 15 nm or more and 35 nm or less, and still more preferably 15 nm or more and less than 30 nm. By setting the thickness to the above range, the transparent conductive layer 3 can be suitably applied for touch panels.

Preferably, the transparent conductive layer 3 is directly formed on the third undercoat layer 23. The constitution provides an increase in interlayer adhesion, and the strength of the $SiO_2$ film is directly reflected, which can provide an improvement in the scratch resistance of the transparent conductive layer.

The consideration of the present inventors showed that the scratch resistance of the transparent conductive layer in the transparent conductive film tends to be improved as the density of the undercoat layer is increased. Although this reason is not certain, it is guessed as follows. When physical contact occurs in the transparent conductive film, the transparent conductive layer may be deformed. It is considered that the deformation causes a deforming stress in the transparent conductive layer, which leads to flaws and cracks in the transparent conductive layer. Therefore, it becomes important to be less likely to cause the deformation of the transparent conductive layer in order to improve the scratch resistance. Herein, when the undercoat layer is provided under the transparent conductive layer, the deformation of the transparent conductive layer is considered to be suppressed by a reinforcing effect based on the strength of the undercoat layer. Therefore, it is considered that the strength of the undercoat layer is generally correlated with the density, which can provide a higher reinforcing effect as the density of the undercoat layer is increased to provide an improvement in the scratch resistance.

The method for forming the transparent conductive layer 3 is not particularly limited, and an appropriate method can be adopted according to materials used for forming the transparent conductive layer 3 and the required film thickness. From the viewpoints of the uniformity of the film thickness and the film-forming efficiency, vacuum film-forming methods such as a chemical vapor deposition (CVD) method and a physical vapor deposition (PVD) method are suitably adopted. Among these, physical vapor deposition methods such as a vacuum vapor deposition method, a sputtering method, an ion plating method, and an electron beam evaporation method are preferable, and a sputtering method is particularly preferable.

From the viewpoint of obtaining a long laminated body, the transparent conductive layer 3 is preferably formed while transporting the film substrate by a roll-to-roll method or the like, for example.

As a sputtering target, the target having an ITO composition can be suitably used. In a sputtering film-forming process, first, a sputtering machine is preferably vented to a degree of vacuum (ultimate vacuum) of preferably $1 \times 10^{-3}$ Pa or less, and more preferably $1 \times 10^{-4}$ Pa or less to create an atmosphere in which water in the sputtering machine and impurities such as an organic gas generated from the substrate have been removed. This is because, when there are water and an organic gas in the machine, they terminate dangling bonds generated during a sputtering film-forming process and prevent the crystal growth of a conductive oxide such as ITO.

A sputtering film-formation process is performed under reduced pressure of 1 Pa or less while introducing a reactive gas such as an oxygen gas in the vented sputtering machine as necessary together with an inert gas such as Ar and transporting the substrate. The pressure upon forming a film is preferably 0.05 to 1 Pa, and more preferably 0.1 to 0.7 Pa. When the pressure for forming a film is too high, the film-forming speed tends to be decreased, and when the pressure is too low, discharge tends to become unstable.

The substrate temperature when ITO film is formed into a film by sputtering is preferably −10 to 190° C., and more preferably −10 to 150° C.

A hard coat layer, an easy adhesion layer, and an anti-blocking layer or the like may be provided on the surface opposite to the surface of the film substrate 1 where the transparent conductive layer 3 is formed if necessary.

EXAMPLES

The present invention will be described in detail with reference to Examples below. However, the present invention is not limited to the following Examples as long as the purport is not deviated. "Part(s)" in each Example is on a weight basis as long as there is no special notation.

Example 1

(Formation of First Undercoat Layer)
A UV curing type resin composition containing an acrylic resin and zirconium dioxide particles (average particle diameter: 20 nm) was diluted with methyl isobutyl ketone (MIBK) so that a solid content concentration was set to 5% by weight. The obtained diluted composition was applied onto one main surface of a polymer film substrate including a 100-μm-thick PET film (Diafoil (trade name) manufactured by Mitsubishi Plastics, Inc.), dried, and cured by UV irradiation, to form an organic undercoat layer having a film thickness of 0.5 μm (500 nm).

(Formation of Second Undercoat Layer and Third Undercoat Layer)
On the organic undercoat layer, a second undercoat layer and a third undercoat layer were sequentially formed by a sputtering method using an AC/MF power source. The second undercoat layer was formed on the first undercoat layer by sputtering an Si target (manufactured by Mitsui Mining and Smelting Co., Ltd.) while $O_2$ was introduced by impedance control into a vacuum atmosphere having atmosphere pressure of 0.3 Pa into which Ar was introduced ($Ar:O_2=100:1$). The obtained second undercoat layer was a 2-nm-thick $SiO_x$ ($x=1.5$) layer. The third undercoat layer was formed on the second undercoat layer by sputtering an Si target (manufactured by Mitsui Mining and Smelting Co., Ltd.) while $O_2$ was introduced by impedance control into a vacuum atmosphere having atmosphere pressure of 0.2 Pa into which Ar was introduced ($Ar:O_2=100:40$). The obtained third undercoat layer was a 23-nm-thick $SiO_2$ film.

(Formation of Transparent Conductive Layer)
Furthermore, a first transparent conductive layer including a 23-nm-thick indium-tin composite oxide layer was formed on the third undercoat layer by a DC magnetron sputtering method with a horizontal magnetic field of 30 mT in a vacuum atmosphere (0.3 Pa) into which Ar and $O_2$ (a flow ratio was $Ar:O_2=99:1$) were introduced, using a sintered object of 10% by weight tin oxide and 90% by weight indium oxide as a target. A second transparent conductive layer including a 2-nm-thick indium-tin composite oxide layer was formed on the first transparent conductive film by a DC magnetron sputtering method with a horizontal magnetic field of 30 mT in a vacuum atmosphere (0.3 Pa) into which Ar and $O_2$ (a flow ratio was $Ar:O_2=99:1$) were introduced, using a sintered object of 3% by weight tin oxide and 97% by weight indium oxide as a target. A transparent conductive film including the amorphous transparent conductive layer having a two-layer structure was produced. The produced transparent conductive film was heated with a 150° C. warm air oven for 45 minutes, to subject the transparent conductive layer to crystal conversion, thereby producing the transparent conductive film including a crystalline transparent conductive layer.

Example 2

A transparent conductive layer and a transparent conductor were produced in the same manner as in Example 1 except that a 25-nm-thick transparent conductive layer was formed as a single layer using a sintered object of 10% by weight tin oxide and 90% by weight indium oxide as a target.

Example 3

A transparent conductive film was produced in the same manner as in Example 1 except that horizontal magnetic fields when a first transparent conductive layer and a second transparent conductive layer were formed were set to 100 mT.

Example 4

A transparent conductive film was produced in the same manner as in Example 2 except that a third undercoat layer was formed while $O_2$ was introduced by impedance control into a vacuum atmosphere having atmosphere pressure of 0.3 Pa into which Ar was introduced (Ar:$O_2$=100:40).

Comparative Example 1

A transparent conductive film was produced in the same manner as in Example 2 except that a $SiO_x$ layer was not formed.

Comparative Example 2

A transparent conductive film was produced in the same manner as in Example 2 except that a $SiO_x$ layer and a $SiO_2$ layer were not formed.

Comparative Example 3

A transparent conductive film was produced in the same manner as in Example 1 except that a first undercoat layer was not formed.

Comparative Example 4

A transparent conductive film was produced in the same manner as in Example 2 except that a third undercoat layer was not formed.

Comparative Example 5

A transparent conductive film was produced in the same manner as in Example 2 except that a third undercoat layer was formed while $O_2$ was introduced by impedance control into a vacuum atmosphere having atmosphere pressure of 1.3 Pa into which Ar was introduced (Ar:$O_2$=100:40).

Comparative Example 6

A transparent conductive film was produced in the same manner as in Example 2 except that a second undercoat layer was not formed, and, as the third undercoat layer, silica sol (obtained by diluting COLCOAT P (manufactured by COL-COAT CO., LTD.) with ethanol in solid concentration of 2% by weight) was coated by a silica coating method, dried by heating at 150° C. for 2 minutes to be cured, thereby forming an $SiO_2$ layer having a thickness of 23 nm.

<Evaluation>

Measurements and valuation methods for the transparent conductive films produced in Examples and Comparative Examples are as follows. The evaluation results are shown in Table 1.

(1) Measurement of Film Thickness

The thickness of each of the organic undercoat layer, $SiO_x$ film, $SiO_2$ film, and ITO film was measured by observing the cross section of the layer or film through a transmission electron microscope ("HF-2000" manufactured by Hitachi Ltd.).

(2) Measurement of Density

The transparent conductive film including the amorphous transparent conductive layer was immersed in hydrochloric acid (concentration: 10% by weight) at 20° C. for 2 minutes to etch the transparent conductive film, thereby obtaining an undercoat layer laminated film with an $SiO_2$ layer as an outermost layer. Then, the undercoat layer laminated film was heat-treated at 150° C. for 45 minutes, and laminated on a silicon substrate to produce a flat test body. Then, the density of the third undercoat layer was obtained according to an X-ray reflectivity method (common name: XRR, X-ray Reflectometer) as a measurement principle. Specifically, the density of the third undercoat layer was obtained by subjecting an X ray profile acquired using an X-ray diffractometer (X' Pert PRO MRD manufactured by PANalytical) to fitting analysis. The fitting was performed by adopting a three-layer model for separately subjecting a first layer closest to the transparent conductive layer, a third layer closest to the film substrate, and a second layer located between the first layer and the third layer to fitting, and the density of the second layer was used as the density of the $SiO_2$ layer.

(3) Measurement of Specific Resistance of Crystalline ITO Film

The surface resistance ($\Omega\square$) of the obtained crystalline transparent conductive layer was measured by a four-point probe method in conformity with JIS K7194 (1994). Specific resistance was calculated from the thickness of the transparent conductive layer obtained by the above item (1) measurement of film thickness, and the surface resistance.

(4) Evaluation of Crystallization

The transparent conductive film was heated with a 150° C. warm air oven, to subject the transparent conductive film to a crystallization treatment. After the transparent conductive film was immersed in hydrochloric acid at 20° C. (concentration: 5% by weight) for 15 minutes, the transparent conductive film was washed with water and dried, and the resistance between terminals at an interval of 15 mm was measured by a tester. It was determined that crystallization of the ITO layer into crystalline had been completed, when the resistance between the terminals at an interval of 15 mm was not more than 10 k$\Omega$ after immersing in hydrochloric acid, washing with water and drying. The case where the ITO film was completed was evaluated as "○", and the case where the ITO film was not completed was evaluated as "x".

(5) Evaluation of Scratch Resistance

After the surface of the transparent conductive layer was rubbed under the following conditions by using HEIDON surface nature measurement machine TYPE-HEIDON 14 manufactured by Shinto Scientific Co., Ltd., film surface resistance (R20) was measured, and a resistance change rate (R20/R0) with respect to an initial film surface resistance value (R0) was obtained to evaluate scratch resistance. The case where the resistance change rate was 1.6 or less was evaluated as "○", and the case where the resistance change rate was more than 1.6 was evaluated as "x".

Abrasion material: Anticon Gold (manufactured by Contec Co., Ltd.)

Load: 650 g/cm$^2$

Abrasion velocity: 30 cm/min

Number of times of abrasion: 20 times/(10 round trips)

TABLE 1

| | Undercoat layer | | | Density of third layer | ITO | | Specific resistance x | Crystallization test | Scratch resistance test | |
|---|---|---|---|---|---|---|---|---|---|---|
| | First layer (μm) | Second layer (nm) | Third layer (nm) | [g/cm³] | First layer (nm) | Second layer (nm) | 10⁻⁴ (Ω·cm) | | R20/R0 | Determination |
| Example 1 | 0.5 | 2 | 23 | 2.27 | 23 | 2 | 3.2 | ○ | 1.1 | ○ |
| Example 2 | 0.5 | 2 | 23 | 2.27 | 25 | — | 3.4 | ○ | 1.1 | ○ |
| Example 3 | 0.5 | 2 | 23 | 2.27 | 23 | 2 | 2.1 | ○ | 1.2 | ○ |
| Example 4 | 0.5 | 2 | 23 | 2.16 | 25 | — | 3.3 | ○ | 1.2 | ○ |
| Comparative Example 1 | 0.5 | — | 23 | 2.27 | 25 | — | 3.4 | ○ | 1.8 | X |
| Comparative Example 2 | 0.5 | — | — | — | 25 | — | 4.8 | X | 2.4 | X |
| Comparative Example 3 | — | 2 | 23 | 2.27 | 23 | 2 | 3.8 | ○ | 2.0 | X |
| Comparative Example 4 | 0.5 | 2 | — | — | 25 | — | 4.3 | X | 1.9 | X |
| Comparative Example 5 | 0.5 | 2 | 23 | 1.87 | 25 | — | 3.5 | ○ | 1.8 | X |
| Comparative Example 6 | 0.5 | — | 23 | 1.8 (wet type) | 25 | — | 4.9 | X | 2.4 | X |

In the transparent conductive films of Examples, both specific resistance and scratch resistance were good. Even when the scratch resistance of the transparent conductive film including the amorphous transparent conductive layer before the crystal conversion treatment was evaluated in Example 1, R20/R0 was 1.6 or less and the result was good. On the other hand, in Comparative Examples, at least one of specific resistance and scratch resistance was poor.

DESCRIPTION OF REFERENCE SIGNS

1: film substrate.
21: first undercoat layer
22: second undercoat layer
23: third undercoat layer
3: transparent conductive layer
10: transparent conductive film

The invention claimed is:

1. A transparent conductive film comprising:
a transparent film substrate;
at least three undercoat layers; and
a transparent conductive layer in this order,
wherein:
the at least three undercoat layers include:
a first undercoat layer formed by a wet coating method and containing an organic resin;
a second undercoat layer that is a metal oxide layer having an oxygen deficient; and
a third undercoat layer that is an SiO₂ film from a side of the film substrate;
the third undercoat layer has a density of 2.0 g/cm³ or more and 2.8 g/cm³ or less; and
the transparent conductive layer has a specific resistance of $1.1 \times 10^{-4}$ Ω·cm or more and $3.8 \times 10^{-4}$ Ω·cm or less in a crystalline state.

2. The transparent conductive film according to claim 1, wherein the second undercoat layer has a thickness of 1 nm or more and 10 nm or less.

3. The transparent conductive film according to claim 1, wherein the second undercoat layer is an $SiO_x$ film (x is 1.0 or more and less than 2).

4. The transparent conductive film according to claim 1, wherein the transparent conductive layer and the third undercoat layer are brought into contact with each other.

5. The transparent conductive film according to claim 1, wherein the first undercoat layer further contains an inorganic particle.

6. The transparent conductive film according to claim 1, wherein the third undercoat layer has a thickness of 8 nm or more and 100 nm or less.

7. The transparent conductive film according to claim 1, wherein the transparent conductive layer has a refractive index of 1.89 or more and 2.20 or less.

8. The transparent conductive film according to claim 1, wherein the transparent conductive layer is crystalline.

9. The transparent conductive film according to claim 1, wherein the transparent conductive layer is an indium-tin composite oxide layer.

10. The transparent conductive film according to claim 9, wherein a content of tin oxide in the indium-tin composite oxide layer is 0.5% by weight to 15% by weight based on the total amount of tin oxide and indium oxide.

11. The transparent conductive film according to claim 1, wherein:
the transparent conductive layer has a structure where a plurality of indium-tin composite oxide layers are laminated; and
at least two layers of the plurality of indium-tin composite oxide layers have existing amounts of tin different from each other.

12. The transparent conductive film according to claim 11, wherein:
the transparent conductive layer has a first indium-tin composite oxide layer and a second indium-tin composite oxide layer in this order from the side of the film substrate;
a content of tin oxide in the first indium-tin composite oxide layer is 6% by weight to 15% by weight based on the total amount of tin oxide and indium oxide; and
a content of tin oxide in the second indium-tin composite oxide layer is 0.5% by weight to 5.5% by weight based on the total amount of tin oxide and indium oxide.

* * * * *